Feb. 19, 1963 R. HOTKINS ET AL 3,078,093
AUTO TEST AMUSEMENT DEVICE
Filed Dec. 10, 1959 5 Sheets-Sheet 1
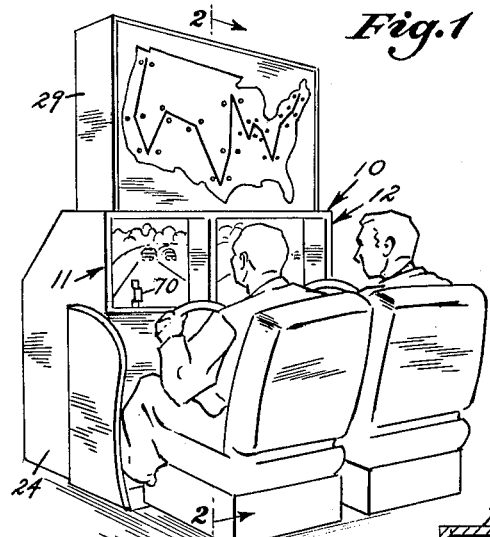
Fig.1
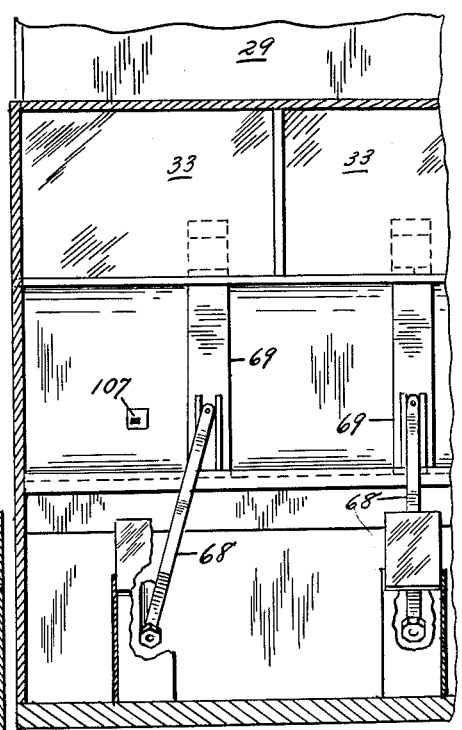
Fig.3
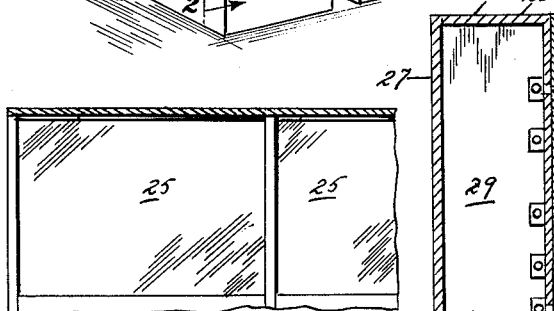
Fig.4
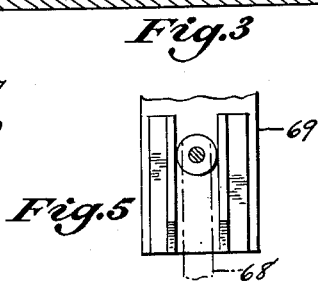
Fig.5
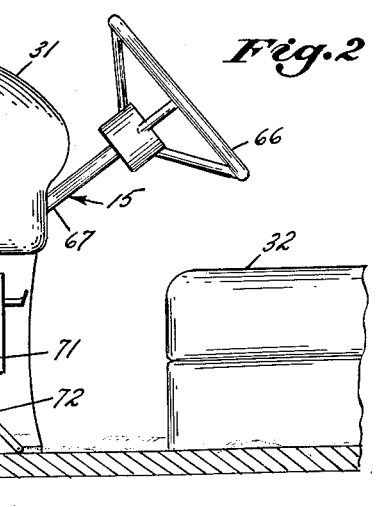
Fig.2
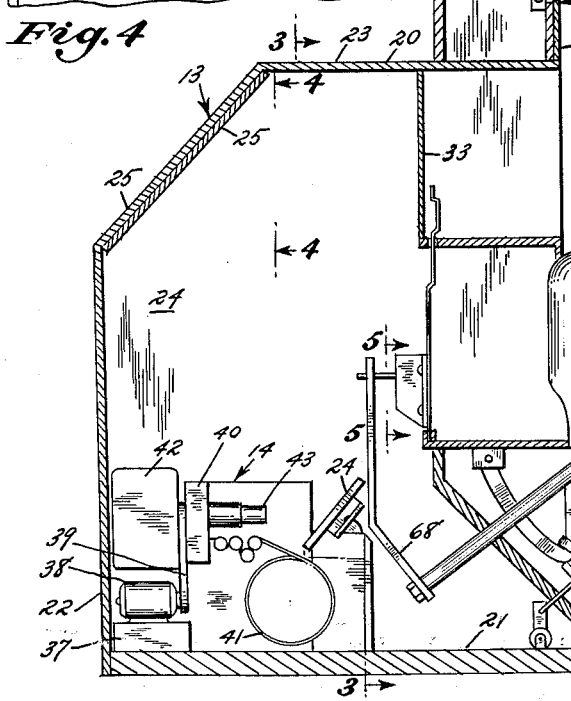

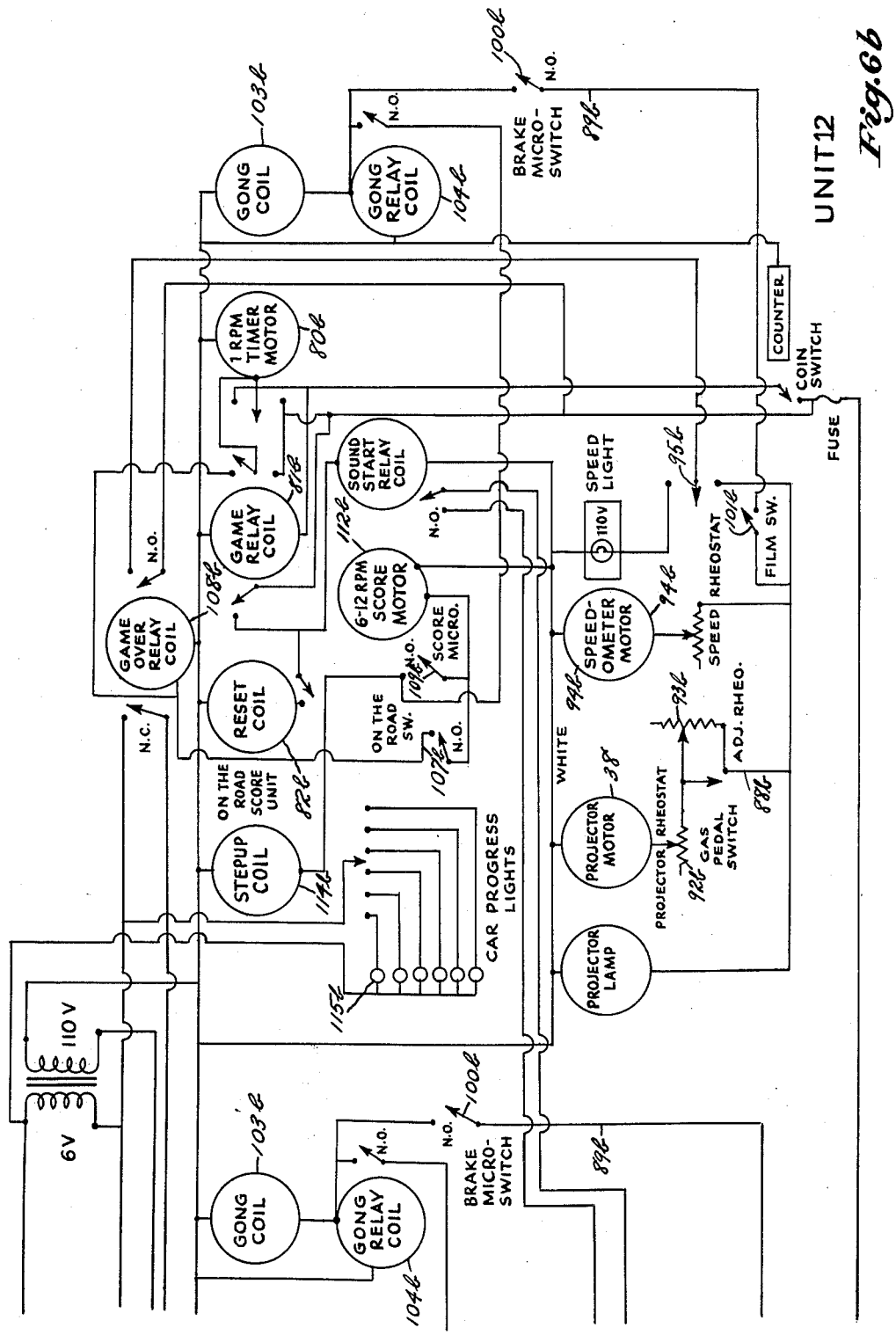

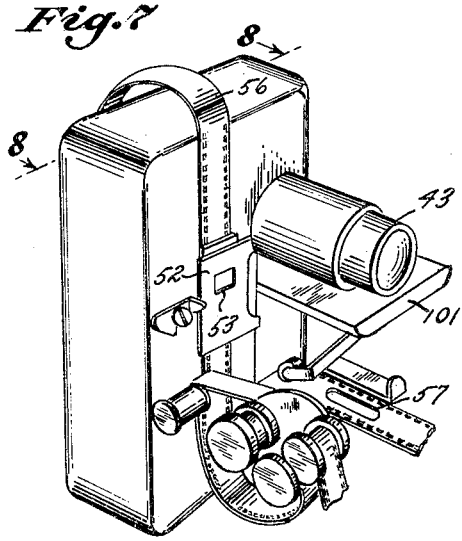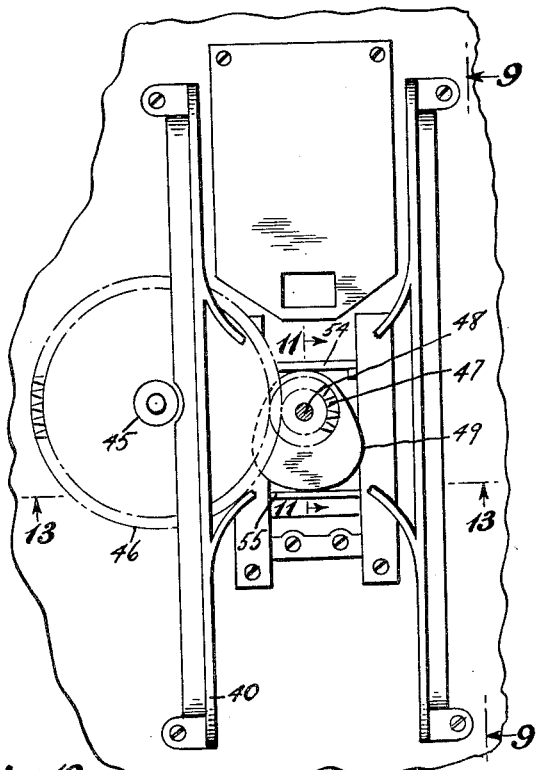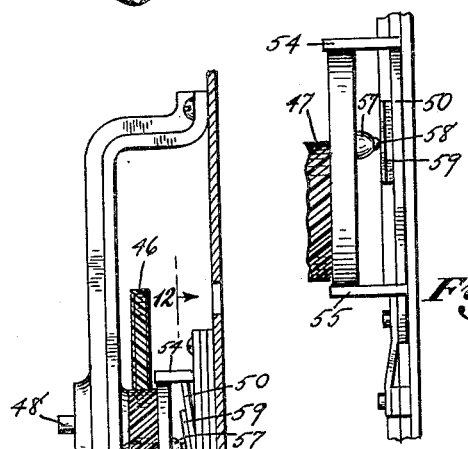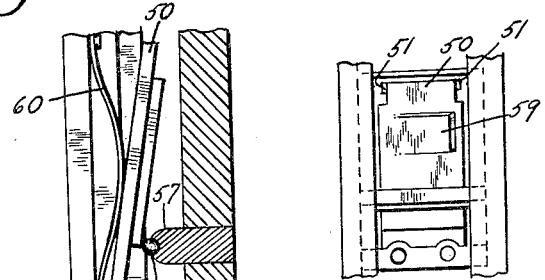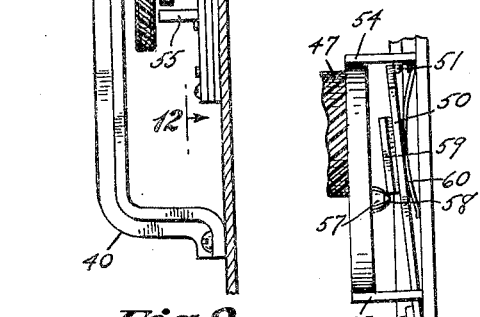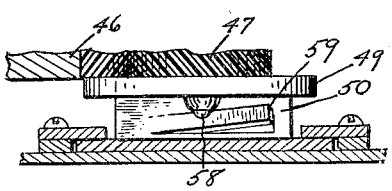

United States Patent Office 3,078,093
Patented Feb. 19, 1963

3,078,093
AUTO TEST AMUSEMENT DEVICE
Ralph Hotkins and Charles Shankman, Brooklyn, N.Y.,
assignors to Capitol Projector Corporation, New York,
N.Y., a corporation of New York
Filed Dec. 10, 1959, Ser. No. 858,734
1 Claim. (Cl. 273—1)

This invention relates generally to the field of coin-operated amusement devices of the type normally found in amusement parks, waiting rooms, and the like, and more particularly to an improved driver test machine in which the player seats himself behind a simulated wheel and operates simulated controls in response to a projected motion picture image positioned to correspond to the windshield of an automobile. Devices of this type are generally known in the art, and the invention lies in specific constructional details which permit added interest to the player.

It is among the principal objects of the present invention to provide an improved device of the class described in which the player may test his skill against a fixed standard progressively as the game proceeds, and which standard may be exceeded or unachieved, depending upon the skill of the player.

Another object of the invention lies in the provision of a driver testing device suitable as an amusement game which may be produced at a reasonably low cost, thus offering wide sale, distribution and use.

Still another object of the invention lies in the provision of an improved amusement device in which the electrical components thereof may be of simple readily accessible nature, thus facilitating servicing of the device from time to time.

A feature of the invention lies in the fact that several units may be connected together so that one or more contestants may play against each other.

These objects and features, as well as other incidental ends and advantages, will more fully appear in the progress of the following disclosure, and be pointed out in the appended claim.

In the drawings, to which reference will be made in the specification, similar reference characters have been employed to designate corresponding parts throughout the several views.

FIGURE 1 is a view in perspective showing an embodiment of the invention.

FIGURE 2 is a side elevational view thereof, partly in section.

FIGURE 3 is a fragmentary vertical sectional view as seen from the plane 3—3 in FIGURE 2.

FIGURE 4 is a fragmentary front elevational view.

FIGURE 5 is a fragmentary enlarged view in elevation corresponding to the central portion of FIGURE 3.

Figure 6:
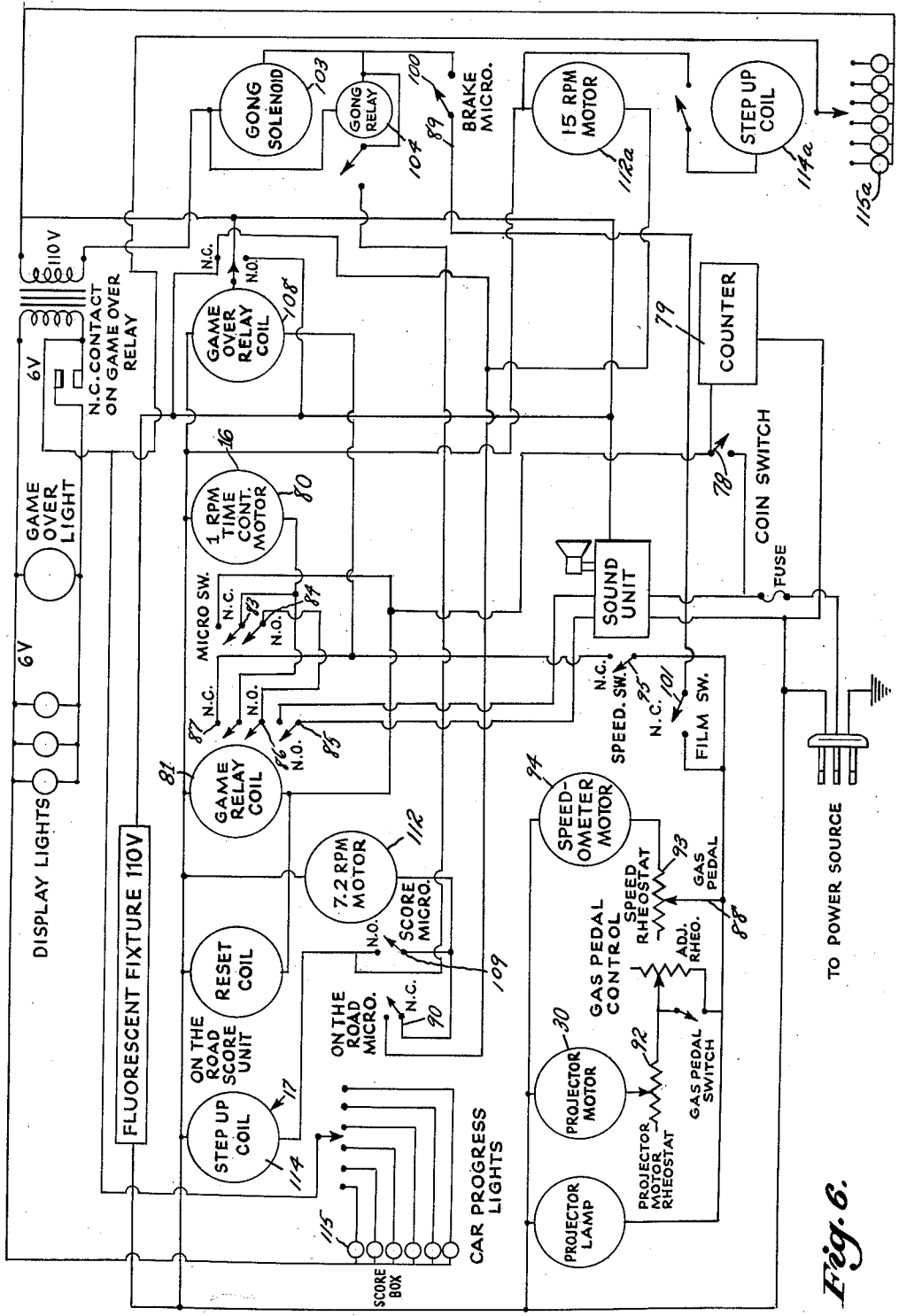
FIGURE 6 is an electrical schematic view showing a single playing unit.
Figure 6A:
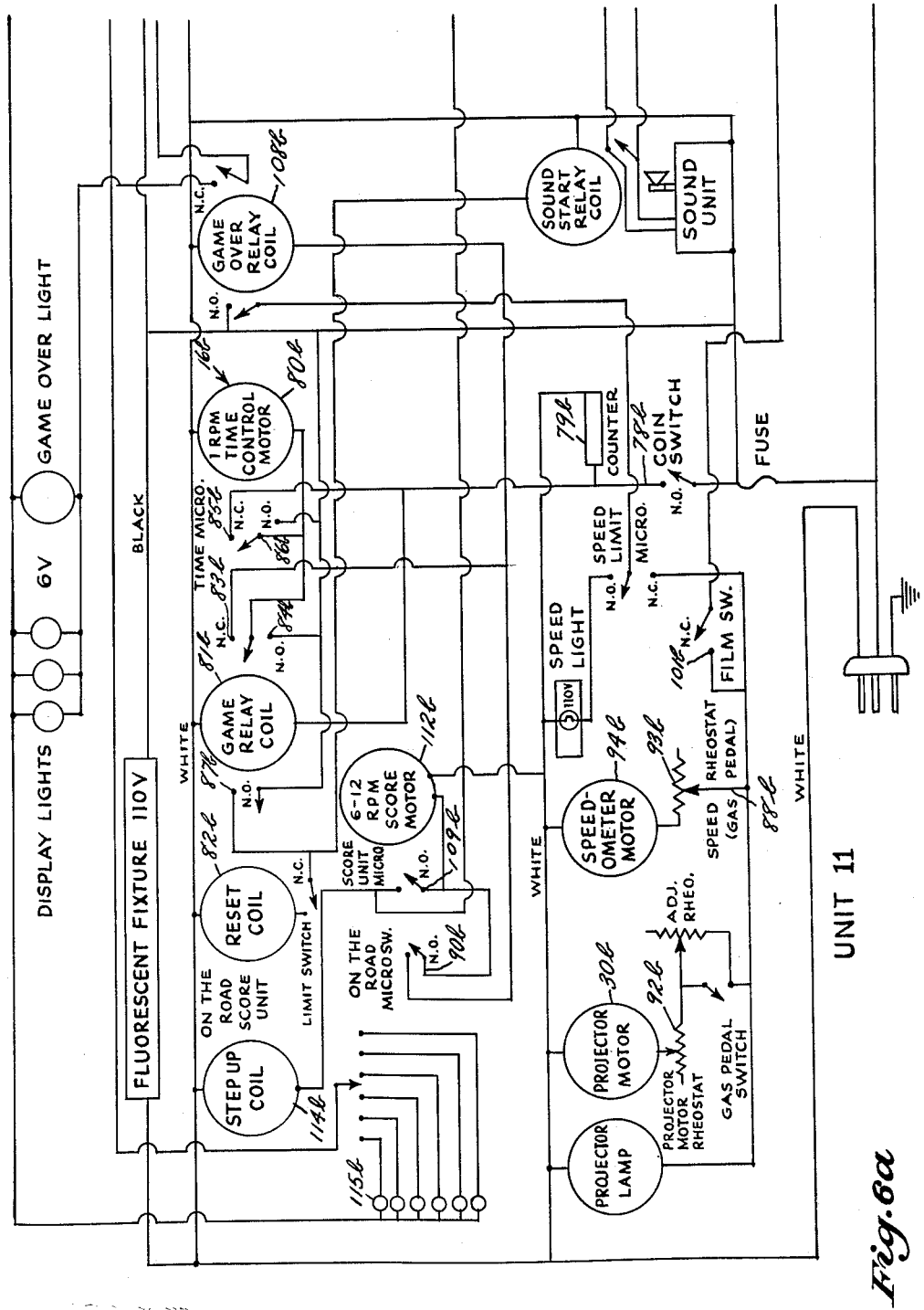

FIGURES 6a and 6b constitute an electrical schematic view employed where two units are used simultaneously, and in which the players compete against each other.

FIGURE 7 is a fragmentary view in perspective showing the projector element which comprises a part of the device.

FIGURE 8 is an enlarged vertical sectional view as seen from the plane 8—8 in FIGURE 7.

FIGURE 9 is a fragmentary vertical sectional view as seen from the plane 9—9 in FIGURE 8.

FIGURE 10 is a fragmentary sectional view corresponding to the central portion of FIGURE 9.

FIGURE 11 is a still further enlarged fragmentary sectional view corresponding to that seen in FIGURE 10, and showing certain of the component parts in altered relative position.

FIGURE 12 is a fragmentary elevational view as might be seen from the righthand portion of FIGURE 10.

FIGURE 13 is a horizontal sectional view as seen from the plane 13—13 in FIGURE 8.

FIGURE 14 is an enlarged fragmentary sectional view corresponding to that seen in FIGURE 10, but showing certain of the parts in altered relative position.

In accordance with the invention, the device, generally indicated by reference character 10, comprises broadly: a plurality of units 11 and 12 (see FIGURE 1), each unit including a cabinet element 13, a projector element 14, driver control means 15, timing means 16, and scoring means 17.

The units 11 and 12 are shown by way of example only, it being possible to have as many individual units as desired, by mere duplication of the individual units and proper electrical interconnection. Accordingly, a description of the unit 11 will serve to describe the other units as well.

The unit 11 is housed in an individual box-like structure 20 which comprises part of the cabinet element 13, the same including a floor 21, a front wall 22, a top wall 23, side walls, one of which is indicated by reference character 24, an inclined wall 25 and a score-board housing 26. The housing 26 may be detachably associated with the box-like structure 20 and includes a rear wall 27, a top wall 28, side walls 29 and a front wall 30.

The box-like structure 20 may also include a simulated instrument panel 31, and preferably a seat member 32. A projection screen 33 is positioned immediately in front of the seat member 32 to simulate the view seen from the driver's seat of an automobile through the windshield thereof. Mirrors 24 and 25 reflect the image from the projector element 14 to the screen 33 in well known manner.

The projector element 14 is generally known in the art as a continuously running type in which a closed loop of motion picture film is continually circulating through the film gate. It includes a base member 37, a projector motor 38, a belt 39 which transmits motion to a film advancement means 40, film recycling means 41 of well known type, a lamp house 42, and a projection lens 43.

Referring to FIGURES 8 to 14, inclusive, the film advancement means 40 includes a driving shaft 45 having a large gear 46 thereon meshing with a spur gear 47 on a shaft 48. The shaft 48 supports a constant width cam member 49 which bears against cam follower members 54 and 55 to move a film advancement plate 50 within a vertical plane. The film advancement plate 50 includes a pair of film advancement claws 51 of well known type which incrementally advance the film, generally indicated by reference character 56 behind a film gate 52 having the usual rectangularly shaped aperture 53. Extending outwardly of the plane of the cam member 49 is a second cam 57 having a ball bearing roller 58 at the outer extremity thereof slideably engageable with a cam follower 59, the same moving the film advancement plate 50 in a generally horizontal plane to move the claws 51 to engage projections within the film 56 in well known manner. By employing the roller 58 as a contacting portion, extremely smooth operation is obtained as contrasted with prior art devices.

Spring means 60 normally moves the film advancement plate 50 in a rightward direction as seen in FIGURE 11, so that the claws 51 are in disengaged condition when moving relative to the film 56. Referring to FIGURE 7, it will be observed that the film 56 is provided at intervals with an elongated opening 57 in the picture area of several frames, the purpose of which will become more clearly apparent later in the disclosure.

The plate 50 is mounted for a combination of translational and rotational movement. Since the contact of the ball bearing 58 moves over a plane, and the spring 60 is relatively fixed, the combination of translation and rotation results. The plate 50 is preferably formed integrally with followers 54 and 55 as a single stamping. The film is positioned in the advancement means shown in FIGURE 14 to the right of the plate 50. The spring 60 does not interfere with the advancement of the film since the spring acts only upon the edges of the plate, and the film passes between the two parts of the spring. The film strip adjacent slot 57 in the lower portion of FIGURE 7 is another segment of the same strip 56, the same being offset in the particular sprocket arrangement employed in projectors of this type.

Referring to FIGURES 2 to 5, inclusive, the driver control means 15 includes a simulated steering wheel 66 mounted upon a column 67 which imparts rotational movement to a lever 68. The lever interconnects with a supporting member 69 having a representation of an automobile 70 mounted thereon in such manner as to overlie a portion of the projection screen 33. A brake pedal 71 and gas pedal 72 simulate those of an actual automobile.

The timing means 16 includes a coin actuated switch 78, an optional coin counter 79, and a one-revolution-per-minute timing motor 80 having a cam (not shown) operating a game relay coil 81. The coil 81 operates a solenoid which cooperates with a reset coil and solenoid (not shown) to move switches 83, 84, 85, 86 and 87 as a gang from opened to closed position.

The scoring means 17 includes components connected to the steering wheel 66, the brake pedal 71 and the gas pedal 72. The gas pedal scoring means 88, brake pedal scoring means 89, and steering wheel means 90 cooperate with each other to provide an additive score during a single cycle of operation.

At this point in the disclosure, the operation of a complete cycle will be described, following which the individual components of the scoring means 17 will be better understood in proper relation.

At the time of closing of the coin switch 78, the player has seated himself upon the device, and is immediately presented with a motion picture representation of typical driving scenes. Pressing the gas pedal 72 results in increasing the rate indicated by a speedometer, and also operates the projector element 14 at a faster rate. As emergency situations appear on the screen, the driver receives additional scoring credit for properly braking within adequate time to avoid an accident, and in addition, he is expected to maintain the car on the road as the scene depicted before him indicates the automobile is travelling from the road. Excessive movement off the road, as indicated by the position of the steering wheel 66 will interrupt the operation of the scoring means thus losing scoring credit during the one minute period the device is in operation. Excessive pressure on the gas pedal 72 will interrupt operation of the projector element, with consequent loss of scoring credit. As a basis of comparison, supplementary scoring means continuously adds points in succession at an even rate during the course of a single cycle, and if all of the emergency situations and steering situations are adequately met, the total number of points to the operator will be greater than the standard set by the supplementary scoring means. At the end of operation for a period of one minute, the timing motor interrupts further operation of the device, stopping the projector element as well as other components.

Referring to FIGURE 6, the gas pedal 72 operates a first rheostat 92 and a second rheostat 93 in series therewith connected to the projector motor 30, the pedal varying the speed of the projector by shorting the latter where greater speed is called for. It simultaneously operates a second rheostat 93 connected to the speedometer drive motor 94. The speedometer drive motor in turn drives a conventional automobile speedometer, operation of the motor being such that a speed of approximately fifty miles an hour is indicated when no pressure is placed upon the pedal 72. A speed switch 95 is also connected to the pedal 72, the same being normally closed until excessive pressure on the pedals 72 opens the same, thus interrupting operation of the projector motor 30.

The brake pedal scoring means 89 includes a brake microswitch 100 connected in series with the film switch 101 which normally closes a circuit through the hole 57 in the film as the same passes therethrough (see FIGURE 7). Closing the circuit through the brake microswitch 100 and the film switch 101 operates the gong solenoid 103 which rings a gong 104 to indicate that a score has been made.

The steering wheel scoring means 90 includes a steering wheel microswitch (see FIGURE 3) 107 connected in series with a game relay coil 108 to a 7.2-revolution-per-minute motor 112 operating a score microswitch 109. The arrangement of the switch 107 is such that when the steering wheel is generally centered, as indicated in the righthand portion of FIGURE 3 as well as FIGURE 5, the switch 107 will be maintained closed, and no penalty in scoring will result. Should the steering wheel be violently twisted in either direction more than is necessary to normally maintain the representation of an automobile 70 on the image of the road appearing on the projection screen, the switch will be opened, resulting in a stopping of the motor 112 and rendering of the scoring means inoperative. Scoring on the part of the player is accomplished by maintaining the motor 112 in operation, by proper pressure upon the gas pedal 72 and proper alignment of the steering wheel 66. With each revolution of the motor 112, an additional point is scored by closing of the switch 109 and operation of the step-up coil 114 which operates, in turn, a plurality of progress lights 115. The step-up coil 114 is also operated by closing of the switch 100 simultaneously with the closing of the switch 101, which will remain closed during the period the opening 57 in the film is passing through the switch.

To provide a basis of comparison, a continuously running 15-revolution-per-minute motor 112a operates a similar step-up coil 114a and separate progress lights 115a, the motor 112a being not subject to interruption in operation, as it is not under the control of the driver. Thus, to exceed the score provided by the means 112a—115a, it is necessary that the pressing of the brake pedal 71 can be accomplished at proper times to actuate the step-up coil 114, and that the steering wheel 66 be properly aligned at the time the motor 112 operates the score microswitch 109.

Turning to FIGURES 6a and 6b, there is shown a schematic diagram of the operation of the two units 11 and 12 in such manner that two drivers may compete against each other. Parts corresponding to those of the diagram shown in FIGURE 6 have been designated by similar reference characters with the additional suffix "b." The diagram is essentially a duplication of the diagram shown in FIGURE 6, with the elimination of the parts 112a—115a and the substitution of an additional scoring means operated by the second driver.

At the conclusion of a cycle, the timing motor 80 interrupts the switches 83—87, thus bringing the operation of the device to a halt. It will be observed that the film 56 need not be cycled to a starting point, as the subject matter of the film is of a continuous type wherein the same may be picked up at any point along the film as a commencement.

We wish it to be understood that we do not consider the invention limited to the precise details of structure shown and set forth in this specification, for obvious modifications will occur to those skilled in the art to which the invention relates.

We claim:

In an amusement device of the class described, a first motor, a first switch operated by said first motor, first scoring means operated by said first switch; a second motor, a second switch operated by said second motor, a second scoring means operated by said second switch; timing means controlling the total operating time of said first and second motors, and manually controlled means for additionally controlling said first scoring means to a degree commensurate with the skill of the user, whereby said second scoring means may serve as a standard score against which said first scoring means may be compared.

References Cited in the file of this patent

UNITED STATES PATENTS

| | | |
|---|---|---|
| 2,203,906 | Hineline | June 11, 1940 |
| 2,265,598 | Firestone | Dec. 9, 1941 |
| 2,587,381 | Peterson | Feb. 26, 1952 |
| 2,709,587 | Meyers | May 31, 1955 |
| 2,715,783 | Chedister | Aug. 23, 1955 |
| 2,755,085 | Giani | July 17, 1956 |
| 2,857,710 | Brown | Oct. 28, 1958 |
| 2,870,548 | Chedister | Jan. 27, 1959 |
| 2,943,855 | Javna | July 5, 1960 |